United States Patent
Korzhenko et al.

(10) Patent No.: US 10,633,508 B2
(45) Date of Patent: Apr. 28, 2020

(54) PRODUCTION OF A MASTER BATCH BASED ON SULPHUR AND CARBONACEOUS NANOFILLERS, THE MASTER BATCH PRODUCED, AND USES THEREOF

(71) Applicant: Arkema France, Colombes (FR)

(72) Inventors: Alexander Korzhenko, Pau (FR); Christophe Vincendeau, Lons (FR); Thierry Aubert, Lescar (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 15/522,125

(22) PCT Filed: Oct. 27, 2015

(86) PCT No.: PCT/FR2015/052887
§ 371 (c)(1),
(2) Date: Apr. 26, 2017

(87) PCT Pub. No.: WO2016/066944
PCT Pub. Date: May 6, 2016

(65) Prior Publication Data
US 2017/0313844 A1  Nov. 2, 2017

(30) Foreign Application Priority Data

Oct. 27, 2014 (FR) .................................. 14 60299
Dec. 12, 2014 (FR) .................................. 14 62297

(51) Int. Cl.
*C08K 3/06* (2006.01)
*C08K 3/04* (2006.01)
(Continued)

(52) U.S. Cl.
CPC ............... *C08K 3/06* (2013.01); *B29C 48/00* (2019.02); *C01B 17/00* (2013.01);
(Continued)

(58) Field of Classification Search
None
See application file for complete search history.

(56) References Cited

U.S. PATENT DOCUMENTS 8,900,484 B2   12/2014  Barchasz et al.
2007/0186823 A1*  8/2007  Van Trier ............... C04B 12/00
                                                    106/806
(Continued)

FOREIGN PATENT DOCUMENTS

CN    102 848 545    5/2014
FR      2 948 233    1/2011
(Continued)

OTHER PUBLICATIONS

International Search Report dated Mar. 16, 2016 for PCT/FR2015/052887.
(Continued)

*Primary Examiner* — Katie L. Hammer
(74) *Attorney, Agent, or Firm* — NK Patent Law

(57) ABSTRACT

The invention relates to a method for producing a master batch comprising between 0.01 and 50 wt. % of carbonaceous nanofillers and at least one sulphurated material such as elemental sulphur by melt compounding, and to the master batch thus produced and the different uses thereof. The invention also relates to a solid composition comprising carbonaceous nanofillers dispersed in a sulphurated material.

11 Claims, 3 Drawing Sheets

(51) Int. Cl.
  *C08K 13/02* (2006.01)
  *C08K 5/36* (2006.01)
  *C08L 23/16* (2006.01)
  *H01M 4/58* (2010.01)
  *H01M 4/38* (2006.01)
  *H01M 4/62* (2006.01)
  *B29C 48/00* (2019.01)
  *C01B 17/00* (2006.01)
  *F41H 1/02* (2006.01)
  *H01M 10/052* (2010.01)
  *C01B 17/02* (2006.01)
  *C08K 5/372* (2006.01)
  *B29K 105/16* (2006.01)

(52) U.S. Cl.
  CPC ...... *C01B 17/0221* (2013.01); *C01B 17/0237* (2013.01); *C01B 17/0243* (2013.01); *C01B 17/0248* (2013.01); *C08K 3/041* (2017.05); *C08K 5/36* (2013.01); *C08K 5/372* (2013.01); *C08K 13/02* (2013.01); *C08L 23/16* (2013.01); *F41H 1/02* (2013.01); *H01M 4/38* (2013.01); *H01M 4/58* (2013.01); *H01M 4/625* (2013.01); *H01M 10/052* (2013.01); *B29K 2105/162* (2013.01); *C01P 2004/03* (2013.01); *C01P 2004/50* (2013.01); *C01P 2004/61* (2013.01); *C08K 2201/011* (2013.01)

(56) References Cited

U.S. PATENT DOCUMENTS

| | | | | |
|---|---|---|---|---|
| 2010/0201023 | A1* | 8/2010 | Piccione | B82Y 30/00 |
| | | | | 264/117 |
| 2011/0256454 | A1* | 10/2011 | Nicolas | C04B 26/08 |
| | | | | 429/232 |
| 2012/0119158 | A1* | 5/2012 | Barchasz | C01B 17/0248 |
| | | | | 252/502 |
| 2012/0292578 | A1* | 11/2012 | Bacher | B82Y 30/00 |
| | | | | 252/511 |
| 2014/0018489 | A1* | 1/2014 | Johnson | C08K 3/08 |
| | | | | 524/440 |
| 2015/0340688 | A1* | 11/2015 | Rhee | H01M 4/625 |
| | | | | 429/231.4 |

FOREIGN PATENT DOCUMENTS

| WO | WO-2013/155038 | 10/2013 |
|---|---|---|
| WO | WO-2013/178930 | 12/2013 |

OTHER PUBLICATIONS

Jung et al., "Sulfur Infiltrated Activated Carbon Cathodes for Lithium Sulfur Cells: The Combined Effects of Pore Size Distribution and Electrolyte Molarity," *Journal of Power Sources*, 2014, vol. 248, pp. 752-761.

Makul et al., "Microwave Pre-Curing of Natural Rubber-Compounding Using a Rectangular Wave Guide," *International Communications in Heat and Mass Transfer*, 2010, vol. 37, No. 7, pp. 914-923.

Zhao et al., "Fabrication of High Conductive S/C Cathode by Sulfur Infiltration into Hierarchical Porous Carbon/Carbon Fiber Weave-Structured Materials via Vapor-Melting Method," *Electrochimica Acta*, 2014, vol. 127, pp. 123-131.

* cited by examiner

PRODUCTION OF A MASTER BATCH BASED ON SULPHUR AND CARBONACEOUS NANOFILLERS, THE MASTER BATCH PRODUCED, AND USES THEREOF

CROSS-REFERENCE TO RELATED APPLICATIONS

This application is a U.S. National Stage application of International Application No. PCT/FR2015/052887, filed Oct. 27, 2015, which claims the benefit of French Application No. 1462297, filed Dec. 12, 2014 and French Application No. 1460299, filed Oct. 27, 2014.

TECHNICAL FIELD

The present invention relates to a process for preparing a masterbatch comprising sulfur, more generally comprising a sulfur-based material, and carbon-based nanofillers, and also the masterbatch obtained in this way and the various uses thereof. Another subject of the invention is a solid composition comprising carbon-based nanofillers dispersed in a sulfur-based material.

PRIOR ART

Sulfur is very widely and commonly used in very numerous fields of industry, especially the chemical industry as synthesis reagent for the preparation of various chemical compounds, such as, for example, sulfuric acid, sulfur dioxide, oleums, carbon disulfide, sulfites or sulfates for the paper industry, or phosphorus pentasulfides as lubricant.

Sulfur is also used as elemental sulfur of formula Ss, for the vulcanization of tires, as fungicide in agriculture, or as sulfur polymers for cement and concrete, or as heat transfer or storage fluid, especially for power stations (thermal or nuclear) or for solar panels, and also as active material for Li/S battery electrodes.

An important raw material for elemental sulfur is hydrogen sulfide, recovered during the exploitation of natural gas deposits or by desulfurization of crude petroleum. Since reserves of natural gas tend to run out, elemental sulfur may be extracted directly by drilling into the Earth's crust, since sulfur is a relatively abundant nonmetallic element (only 0.06% of the Earth's crust, but readily extractable) and is non-toxic.

The availability of the raw material makes it possible to envisage the large-scale and long-term development of uses of sulfur, in elemental form or in the form of sulfur-based material, in numerous fields of application.

In some of these applications it may be advantageous to add carbon-based nanofillers such as carbon nanotubes (CNT) to the use of sulfur, in order to provide properties of electrical conductivity and/or mechanical properties. For example, it is envisaged to introduce carbon nanotubes to thermosetting elastomers before their vulcanization in order to produce reinforced tires, or else it is envisaged to add carbon nanotubes into formulations of electrodes for lithium-sulfur batteries in order to improve the kinetics of the electrochemical reactions involved.

However, it has never been envisaged to directly introduce carbon nanotubes into sulfur, especially because CNTs prove difficult to handle and disperse because of their small size, their pulverulence and potentially, when they are obtained by chemical vapor deposition (CVD), their entangled structure which generates strong van der Waals interactions between their molecules.

In document FR 2 948 233 a conductive composite material is described, obtained from a chemical treatment of sulfur and carbon, introduced into a sealed reactor without external regulation of the pressure within the reactor, at a temperature of between 115° C. and 400° C., for a sufficient amount of time to cause the sulfur to melt and equilibrium to be reached. This material is in the form of particles of sulfur covered with carbon having a low specific surface area. The process for introducing carbon into sulfur, described in this document, is only applicable to carbon-based nanofillers without form factor or aggregation.

There therefore remains a need to have a means which makes it possible to simply and homogeneously disperse carbon nanotubes in elemental sulfur, in order to "dope" the sulfur to give it the mechanical and/or conductive properties necessary for the envisaged application. It would then be advantageous for the compounder to have a powder of sulfur comprising well dispersed CNTs, in the form of ready-to-use masterbatches.

The applicant has discovered that this requirement could be met by carrying out a process comprising bringing CNTs into contact with elemental sulfur via the melt route in a compounding device, followed by transformation of the mixture obtained into a fine powder by conventional grinding techniques.

It has moreover become apparent that this invention could also be applied to carbon-based nanofillers other than CNTs, in particular to carbon nanofibers, to graphene and to carbon black, or mixtures thereof in any proportions.

In addition, the invention may more generally be applied to "sulfur donor" sulfur-based materials.

SUMMARY OF THE INVENTION

A subject of the invention is a process for preparing a masterbatch comprising from 0.01% to 50% by weight of carbon-based nanofillers, comprising:
  (a) introducing at least one sulfur-based material, carbon-based nanofillers, and optionally a rheology modifier into a compounding device;
  (b) melting the sulfur-based material;
  (c) kneading the molten sulfur-based material and the carbon-based nanofillers and optionally the rheology modifier;
  (d) recovering the mixture obtained in an agglomerated solid physical form;
  (e) optionally grinding the mixture into a powder.

"Carbon-based nanofiller" denotes a filler comprising at least one element from the group formed of carbon nanotubes, carbon nanofibers, graphene, and carbon black, or a mixture thereof in any proportions. Preferably, the carbon-based nanofillers are carbon nanotubes, alone or in a mixture with graphene.

"Sulfur-based material" is intended to mean elemental sulfur or "sulfur donor" compounds such as sulfur-based organic polymers or compounds and sulfur-based inorganic compounds such as anionic polysulfides of alkali metals.

According to a preferred embodiment of the invention, elemental sulfur is used as the sulfur-based material, alone or in a mixture with at least one other sulfur-based material.

Compounding devices have never been used to produce an intimate mixture of molten sulfur and carbon-based nanofillers.

Sulfur is solid at room temperature and becomes liquid starting at 115° C. (melting point).

One of the drawbacks of liquid sulfur is that its viscosity varies greatly, and non-linearly, as a function of the temperature. In order to overcome these drawbacks linked to the unstable viscosity, one of the technical restrictions of the compounding device is a relatively tight window for the melt process. The rheology of the loaded liquid sulfur must be controlled with perfect management of the process operating conditions, optionally using additives which reduce the viscosification above 140° C.

The process according to the invention makes it possible to create homogeneous combining of the particles of carbon-based nanofillers with the sulfur, thereby giving it mechanical and/or conductive properties which are exploited in numerous applications.

Another subject of the invention is the masterbatch able to be obtained according to the process described above.

Another aspect of the invention relates to the use of the masterbatch as elastomer vulcanization agent for the manufacture of bodywork or sealing joints, tires, soundproofing plates, static charge dissipaters, internal conductive layers for high-voltage and medium-voltage cables, or antivibration systems such as motor vehicle shock absorbers, or in the manufacture of structural components for bullet-proof vests or as active material for the manufacture of electrodes for Li/S batteries or supercapacitors, without this list being limiting.

The invention also deals with a solid composition comprising from 0.01 to 50% by weight, preferably from 1 to 30% by weight, of carbon-based nanofillers dispersed in a sulfur-based material, and also to the various uses thereof.

DETAILED DESCRIPTION OF THE INVENTION

Figure 1:
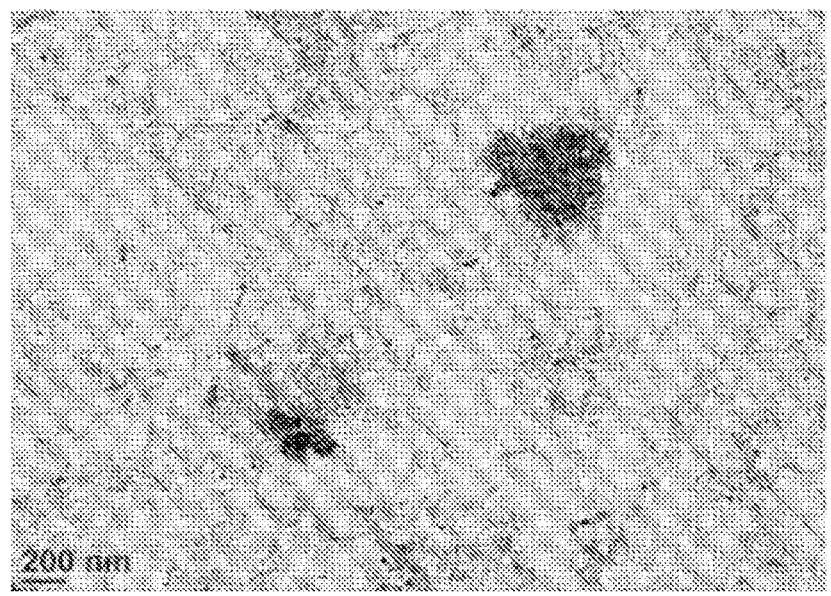
FIG. 1 illustrates, on an SEM, the morphology of the S/CNT masterbatch obtained in example 1 according to the invention.

The invention is now described in greater detail and nonlimitingly in the following description.

The process according to the invention is carried out in a compounding device.

According to the invention, "compounding device" is intended to mean an apparatus conventionally used in the plastics industry for melt mixing thermoplastic polymers and additives with a view to producing composites.

This type of apparatus has never been used for producing an intimate mixture of sulfur and/or of sulfur-based material and carbon-based nanofillers. In this apparatus, the sulfur-based material and the carbon-based nanofillers are mixed by means of a device with high shear, for example a co-rotating twin-screw extruder or a co-kneader. The molten material generally leaves the apparatus in an agglomerated solid physical form, for example in the form of granules, or in the form of rods which are cut into granules after cooling.

Examples of co-kneaders which may be used according to the invention are the BUSS® MDK 46 co-kneaders and those of the BUSS® MKS or MX series, sold by BUSS AG, which all consist of a screw shaft provided with flights, placed in a heated barrel optionally made up of several parts, and the internal wall of which is provided with kneading teeth designed to cooperate with the flights so as to shear the kneaded material. The shaft is rotated, and given an oscillatory movement in the axial direction, by a motor. These co-kneaders may be equipped with a granulation system, for example fitted at their exit orifice, which may consist of an extrusion screw or a pump.

The co-kneaders that may be used according to the invention preferably have an L/D screw ratio ranging from 7 to 22, for example from 10 to 20, whereas co-rotating extruders advantageously have an L/D ratio ranging from 15 to 56, for example from 20 to 50.

In order to achieve optimal dispersion of the carbon-based nanofillers in the sulfur-based material in the compounding device, it is necessary to apply a large amount of mechanical energy, which is preferably greater than 0.05 kWh/kg of material.

The compounding step is carried out at a temperature higher than the melting point of the sulfur-based material. In the case of elemental sulfur, the compounding temperature may range from 120° C. to 150° C. In the case of other types of sulfur-based material, the compounding temperature depends on the material specifically used, the melting point of which is generally given by the supplier of the material. The residence time will also be adapted to the nature of the sulfur-based material.

The Sulfur-Based Material

Various sources of elemental sulfur are commercially available. The particle size of the elemental sulfur powder may vary within wide limits. The elemental sulfur may be used as is, or the sulfur may be purified beforehand according to various techniques such as refining, sublimation or precipitation.

The elemental sulfur or sulfur-based material may also be subjected to a preliminary stage of grinding and/or sieving in order to reduce the size of the particles and to narrow their distribution.

Mention may be made, as sulfur-based materials chosen from sulfur-based organic polymers or compounds, of organic polysulfides, organic polythiolates including, for example, functional groups such as dithioacetal, dithioketal or trithioorthocarbonate, aromatic polysulfides, polyetherpolysulfides, salts of polysulfide acids, thiosulfonates [—S(O)$_2$—S—], thiosulfinates [—S(O)—S—], thiocarboxylates [—C(O)—S—], dithiocarboxylates [—RC(S)—S—], thiophosphates, thiophosphonates, thiocarbonates, organometallic polysulfides or mixtures thereof.

Examples of such organosulfur-based compounds are especially described in document WO 2013/155038.

According to the invention, use may be made, as sulfur-based material, of a sulfur-based inorganic compound, for example chosen from anionic polysulfides of alkali metals, such as lithium.

According to a particular embodiment of the invention, the sulfur-based material is an aromatic polysulfide.

Aromatic polysulfides correspond to the following general formula (I):

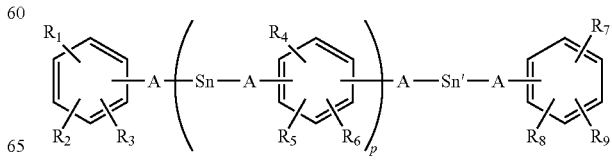

in which:
$R_1$ to $R_9$ represent, identically or differently, a hydrogen atom, an —OH or —O$^-$M$^+$ radical, or a saturated or unsaturated carbon-based chain comprising from 1 to 20 carbon atoms, or an —OR$_{10}$ group, with Rio possibly being an alkyl, arylalkyl, acyl, carboxyalkoxy, alkyl ether, silyl or alkylsilyl radical comprising from 1 to 20 carbon atoms.

M represents an alkali metal or alkaline earth metal, n and n' are two integers which are identical or different, each being greater than or equal to 1 and less than or equal to 8, p is an integer between 0 and 50, and A is a nitrogen atom, a single bond or a saturated or unsaturated carbon-based chain of 1 to 20 carbon atoms.

Preferably, in formula (I):

$R_1$, $R_4$ and $R_7$ are O$^-$M$^+$ radicals, $R_2$, $R_5$ and $R_8$ are hydrogen atoms, $R_3$, $R_6$ and $R_9$ are saturated or unsaturated carbon-based chains comprising from 1 to 20 carbon atoms, preferably from 3 to 5 carbon atoms, the mean value of n and of n' is approximately 2, the mean value of p is between 1 and 10, preferably between 3 and 8. (These mean values are calculated by those skilled in the art from proton NMR data and by assaying the sulfur by weight).

A is a single bond connecting the sulfur atoms to the aromatic rings.

Such poly(alkylphenol) polysulfides of formula (I) are known and may be prepared, for example, in two steps:

1) reaction of sulfur monochloride or dichloride with an alkylphenol, at a temperature of between 100 and 200° C., according to the following reaction:

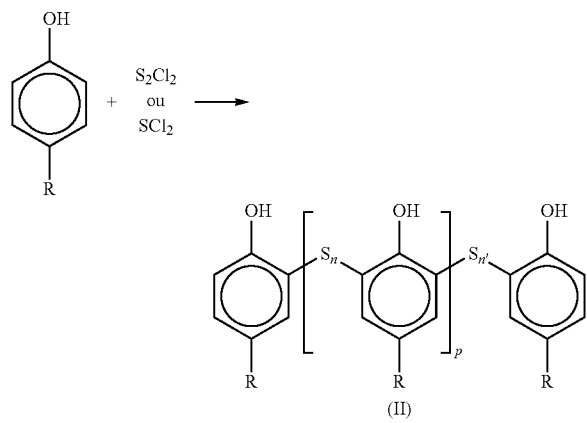

The compounds of formula (II) are especially sold by Arkema under the name Vultac®.

2) reaction of the compound (II) with a metal derivative comprising the metal M, such as, for example, an oxide, a hydroxide, an alkoxide or a dialkylamide of this metal, in order to obtain O$^-$M$^+$ radicals.

According to a more preferred variant, R is a tert-butyl or tert-pentyl radical.

According to another preferred variant of the invention, use is made of a mixture of compounds of formula (I) in which 2 of the R radicals present on each aromatic unit are carbon-based chains comprising at least one tertiary carbon via which R is connected to the aromatic ring.

The Carbon-Based Nanofillers

The amount of carbon-based nanofillers represents from 0.01% to 50% by weight, preferably from 1% to 30% by weight, more preferentially from 5% to 25% by weight relative to the total weight of the masterbatch.

According to the invention, the carbon-based nanofillers are carbon nanotubes, carbon nanofibers, graphene or carbon black or a mixture thereof in any proportions. The carbon-based nanofillers are preferably carbon nanotubes, alone or in a mixture with at least one other carbon-based conductive filler, preferably with graphene.

The carbon nanotubes participating in the composition of the masterbatch may be of the single-walled, double-walled or multi-walled type. The double-walled nanotubes may especially be prepared as described by Flahaut et al. in Chem. Com. (2003), 1442. The multi-walled nanotubes may for their part be prepared as described in document WO 03/02456.

The carbon nanotubes used according to the invention customarily have a mean diameter ranging from 0.1 to 200 nm, preferably from 0.1 to 100 nm, more preferentially from 0.4 to 50 nm and better still from 1 to 30 nm, or even from 10 to 15 nm, and advantageously have a length of more than 0.1 μm and advantageously from 0.1 to 20 μm, preferably from 0.1 to 10 μm, for example approximately 6 μm. Their length/diameter ratio is advantageously greater than 10 and most often greater than 100. These nanotubes thus especially comprise "VGCF" nanotubes (carbon fibers obtained by chemical vapor deposition or Vapor Grown Carbon Fibers). The specific surface area thereof is for example between 100 and 300 m$^2$/g, advantageously between 200 and 300 m$^2$/g, and the apparent density thereof may especially be between 0.01 and 0.5 g/cm$^3$ and more preferentially between 0.07 and 0.2 g/cm$^3$. The multi-walled carbon nanotubes may for example comprise from 5 to 15 sheets and more preferentially from 7 to 10 sheets.

These nanotubes may be treated or untreated.

An example of crude carbon nanotubes is especially the tradename Graphistrength® C100 from Arkema.

These nanotubes may be purified and/or treated (for example oxidized) and/or ground and/or functionalized.

The grinding of the nanotubes may especially be carried out under cold conditions or under hot conditions and can be carried out according to the known techniques employed in apparatus such as ball, hammer, edge runner, knife or gas jet mills or any other grinding system capable of reducing the size of the entangled network of nanotubes. It is preferable for this grinding step to be carried out according to a gas jet grinding technique and in particular in an air jet mill.

The crude or ground nanotubes can be purified by washing using a sulfuric acid solution, so as to free them from possible residual inorganic and metallic impurities, such as, for example, iron, originating from their preparation process. The weight ratio of the nanotubes to the sulfuric acid may especially be between 1:2 and 1:3. The purification operation can furthermore be carried out at a temperature ranging from 90° C. to 120° C., for example for a duration of 5 to 10 hours. This operation may advantageously be followed by steps in which the purified nanotubes are rinsed with water and dried. In a variant, the nanotubes may be purified by high-temperature heat treatment, typically at greater than 1000° C.

The nanotubes are advantageously oxidized by bringing them into contact with a solution of sodium hypochlorite containing from 0.5 to 15% by weight of NaOCl and preferably from 1 to 10% by weight of NaOCl, for example in a weight ratio of the nanotubes to the sodium hypochlorite ranging from 1:0.1 to 1:1. The oxidation is advantageously carried out at a temperature of less than 60° C. and preferably at room temperature, for a duration ranging from a few minutes to 24 hours. This oxidation operation may advantageously be followed by steps in which the oxidized nanotubes are filtered and/or centrifuged, washed and dried.

The nanotubes can be functionalized by grafting reactive units, such as vinyl monomers, to the surface of the nanotubes. The constituent material of the nanotubes is used as radical polymerization initiator after having been subjected to a heat treatment at more than 900° C., in an anhydrous medium devoid of oxygen, which is intended to remove the oxygen-comprising groups from its surface. It is thus possible to polymerize methyl methacrylate or hydroxyethyl methacrylate at the surface of carbon nanotubes.

Use is preferably made in the present invention of optionally ground crude carbon nanotubes, that is to say nanotubes which are neither oxidized nor purified nor functionalized and which have not been subjected to any other chemical and/or heat treatment.

Moreover, use is preferably made of carbon nanotubes obtained from a renewable starting material, in particular of plant origin, as described in Application FR 2 914 634.

Carbon nanofibers are, like carbon nanotubes, nanofilaments produced by chemical vapor deposition (or CVD) starting from a carbon-based source which is decomposed on a catalyst comprising a transition metal (Fe, Ni, Co, Cu), in the presence of hydrogen, at temperatures of 500° C. to 1200° C. However, these two carbon-based fillers differ in their structure (I. Martin-Gullon et al., Carbon, 44 (2006), 1572-1580). This is because carbon nanotubes consist of one or more graphene sheets wound concentrically around the axis of the fiber to form a cylinder having a diameter of 10 to 100 nm. Conversely, carbon nanofibers are composed of more or less organized graphite regions (or turbostratic stacks), the planes of which are inclined at variable angles relative to the axis of the fiber. These stacks may take the form of platelets, fishbones or dishes stacked in order to form structures having a diameter generally ranging from 100 nm to 500 nm, or even more.

Moreover, use is preferably made of carbon nanofibers having a diameter of 100 to 200 nm, for example of approximately 150 nm (VGCF® from Showa Denko), and advantageously a length of 100 to 200 μm.

Graphene denotes a flat, isolated and separate graphite sheet but also, by extension, an assemblage comprising between one and a few tens of sheets and exhibiting a flat or more or less wavy structure. This definition thus encompasses FLGs (Few Layer Graphene), NGPs (Nanosized Graphene Plates), CNSs (Carbon NanoSheets) and GNRs (Graphene NanoRibbons). On the other hand, it excludes carbon nanotubes and nanofibers, which respectively consist of the winding of one or more graphene sheets coaxially and of the turbostratic stacking of these sheets. Furthermore, it is preferable for the graphene used according to the invention not to be subjected to an additional step of chemical oxidation or of functionalization.

The graphene used according to the invention is obtained by chemical vapor deposition or CVD, preferably according to a process using a pulverulent catalyst based on a mixed oxide. It is characteristically in the form of particles having a thickness of less than 50 nm, preferably of less than 15 nm, more preferentially of less than 5 nm, and having lateral dimensions of less than a micron, preferably from 10 nm to less than 1000 nm, more preferably from 50 to 600 nm, or even from 100 to 400 nm. Each of these particles generally includes from 1 to 50 sheets, preferably from 1 to 20 sheets and more preferentially from 1 to 10 sheets, or even from 1 to 5 sheets, which are capable of being separated from one another in the form of independent sheets, for example during a treatment with ultrasound.

Carbon black is a colloidal carbon-based material manufactured industrially by incomplete combustion of heavy petroleum products and which is in the form of carbon spheres and of aggregates of these spheres, the dimensions of which are generally between 10 and 1000 nm.

The process according to the invention makes it possible to efficiently and homogeneously disperse a large amount of carbon-based nanofillers in the sulfur-based material. The carbon-based nanofillers are thus dispersed homogeneously throughout the mass of particles, and are not solely found at the surface of the sulfur-based particles as described in document FR 2 948 233.

In addition, it is possible to add, during the compounding step, an additive which modifies the rheology of the sulfur-based material, such as sulfur in the molten state, in order to reduce the self-heating of the mixture in the compounding device. Such additives having a fluidizing effect on the liquid sulfur are described in Application WO 2013/178930. Mention may be made, by way of examples, of dimethyl sulfide, diethyl sulfide, dipropyl sulfide, dibutyl sulfide, dimethyl disulfide, diethyl disulfide, dipropyl disulfide, dibutyl disulfide, the trisulfide homologs thereof, the tetrasulfide homologs thereof, the pentasulfide homologs thereof, the hexasulfide homologs thereof, alone or in mixtures of two or more thereof in any proportions.

The amount of rheology-modifying additive is generally between 0.01% to 5% by weight, preferably from 0.1% to 3% by weight relative to the total weight of the masterbatch.

According to a particular aspect of the invention, at least one additive may be introduced into the compounding device. The nature of the additive will be adapted to the final use of the ready-to-use masterbatch.

As additives, mention may for example be made of vulcanization accelerators or activators, lubricants, pigments, stabilizers, fillers or reinforcers, antistatic agents, fungicides, flame retardants, solvents, ionic conductors, or binders, without this list being limiting.

At the outlet of the compounding device, the masterbatch is in the agglomerated physical form, for example in the form of granules.

In a final step, the masterbatch may be subjected to a grinding step according to techniques well known to those skilled in the art, so as to obtain a masterbatch in powder form. Use may be made, as apparatus, of a hammer mill, a bead mill, an air jet mill or a planetary mixer. At the end of this stage, the desired median diameter $D_{50}$ will depend on the use of the masterbatch and is generally between 1 and 60 μm, preferably between 10 and 50 μm, preferably between 10 and 20 μm.

At the end of the process according to the invention, a masterbatch is obtained having carbon-based nanofillers well dispersed in the mass of the particles. This morphology can be confirmed in particular by observation using a transmission electron microscope or a scanning electron microscope.

The invention thus relates to a solid composition comprising from 0.01 to 50% by weight, preferably from 1 to 30% by weight, and more preferably from 5 to 25% by weight of carbon-based nanofillers dispersed in a sulfur-based material.

The solid composition may also comprise at least one additive chosen from rheology modifiers, vulcanization accelerators or activators, lubricants, pigments, stabilizers, fillers or reinforcers, antistatic agents, fungicides, flame retardants, solvents, ionic conductors, or binders, or the combination thereof.

The solid composition may be obtained according to the process described above and may be in powder form after grinding. The powder has particles with a median diameter $D_{50}$ of between 1 and 60 µm, preferably between 10 and 50 µm.

The composition according to the invention is advantageously used for the manufacture of bodywork or sealing joints, tires, soundproofing plates, static charge dissipaters, internal conductive layers for high-voltage and medium-voltage cables, or antivibration systems such as motor vehicle shock absorbers, or in the manufacture of structural components for bullet-proof vests or for the manufacture of electrodes for Li/S batteries or supercapacitors.

The masterbatch able to be obtained following the process according to the invention or the solid composition according to the invention may be used in conventional applications for sulfur, or more generally for sulfur-based materials, but it also makes it possible to develop novel applications which require mechanical reinforcement or electronic conductivity provided by the presence of carbon-based nanofillers within the sulfur-based material.

The invention will now be illustrated by the following examples, the objective of which is not to limit the scope of the invention, defined by the appended claims.

EXPERIMENTAL SECTION

Example 1: Preparation of an S/CNT Masterbatch

CNTs (Graphistrength® C100 from ARKEMA) and solid sulfur (50-800 µm) were introduced into the first feed hopper of a BUSS® MDK 46 (L/D=11) co-kneader fitted with a discharge extrusion screw and a granulation device.

The temperature settings within the co-kneader were as follows: Zone 1: 140° C.; Zone 2: 130° C.; Screw: 120° C.

At the outlet of the die, the masterbatch consisting of 85% by weight of sulfur and 15% by weight of CNT is in the form of granules obtained by pelletizing, cooled by a water jet. Observation by scanning electron microscope (SEM) showed that the CNTs were well dispersed in the sulfur (FIG. 1).

The granules obtained were dried to a moisture content <100 ppm.

The dry granules were then ground in a hammer mill, cooling being provided by nitrogen.

Figure 2:
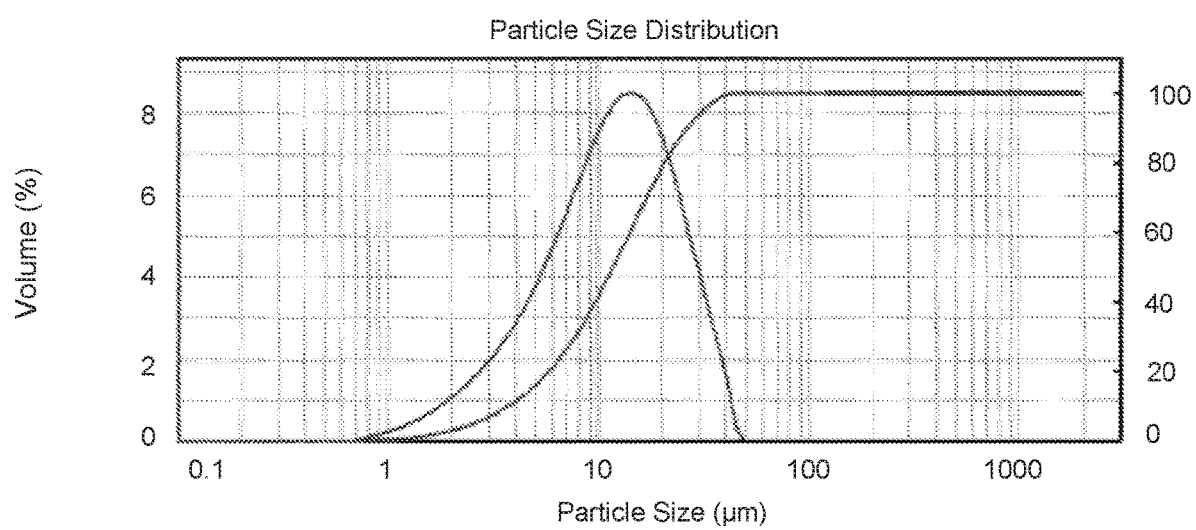
FIG. 2 represents the particle size distribution of the powder obtained in example 1 according to the invention.

A powder with a $D_{50}$ of between 10 and 15 µm, and D100<50 µm, was obtained. FIG. 2 represents the particle size distribution of the powder and highlights the absence of particles larger than 50 µm in size, making it possible to avoid the formation of defects during the use of this powder for the production of cathodes for Li/S batteries.

Figure 3:
FIG. 3 illustrates, by SEM, the homogeneous bulk morphology of a particle of the powder obtained in example 1 according to the invention.

FIG. 3 uses scanning electron microscopy to show the homogeneous bulk morphology of a particle.

This powder consisting of 85% by weight of sulfur and 15% by weight of CNT can be used, for example, for the preparation of an active material for electrodes for Li/S batteries, or of a base EPDM formulation for application in profiled elements in the automotive industry.

Example 2: Preparation of an S/DMDS/CNT Masterbatch

CNTs (Graphistrength® C100 from ARKEMA) and solid sulfur (50-800 µm) were introduced into the first feed hopper of a BUSS® MDK 46 (L/D=11) co-kneader fitted with a discharge extrusion screw and a granulation device.

Liquid dimethyl disulfide (DMDS) was injected into the $1^{st}$ zone of the co-kneader.

The temperature settings within the co-kneader were as follows: Zone 1: 140° C.; Zone 2: 130° C.; Screw: 120° C.

At the outlet of the die, the masterbatch consisting of 78% by weight of sulfur, 2% by weight of DMDS and 20% by weight of CNT is in the form of granules obtained by pelletizing, cooled by a water jet.

The granules obtained were dried to a moisture content <100 ppm.

The dry granules were then ground in a hammer mill, cooling being provided by nitrogen.

A powder having a median diameter $D_{50}$ of between 10 and 15 µm was obtained, which can be used for the preparation of an electrode for Li/S batteries.

Example 3: Preparation of an S/Poly(Tert-Butylphenol) Disulfide/CNT Masterbatch

CNTs (Graphistrength® C100 from ARKEMA) and solid sulfur (50-800 µm) were introduced into the first feed hopper of a BUSS® MDK 46 (L/D=11) co-kneader fitted with a discharge extrusion screw and a granulation device.

Liquid dimethyl disulfide (DMDS) was injected into the $1^{st}$ zone of the co-kneader.

The poly(tert-butylphenol) disulfide sold under the name VULTAC-TB7® from Arkema was premixed with an Li salt, sold under the name LOA (Lithium 4,5-dicyano-2-(trifluoromethyl)imidazole) by Arkema, then introduced into the first hopper by means of a $3^{rd}$ metering device.

The temperature settings within the co-kneader were as follows: Zone 1: 140° C.; Zone 2: 130° C.; Screw: 120° C.

At the outlet of the die, the mixture is in the form of granules obtained by pelletizing, cooled by a water jet.

The granules obtained were dried to a moisture content <100 ppm.

The dry granules were then ground in a hammer mill, cooling being provided by nitrogen.

A powder consisting of 77% by weight of sulfur, 2% by weight of DMDS and 15% by weight of CNT, 5% of VULTAC-TB7®, 1% of LOA, having a $D_{50}$ of between 10 and 15 µm is obtained, which can be used for the preparation of an electrode for Li/S batteries.

Example 4: Preparation of an S/Poly(Tert-Butylphenol) Disulfide/Stearic Acid/ZnO/CNT Masterbatch CNTs (Graphistrength® C100 from ARKEMA) were introduced into the first feed hopper of a BUSS® MDK 46 (L/D=11) co-kneader fitted with a discharge extrusion screw and a granulation device.

The poly(tert-butylphenol) disulfide sold under the name VULTAC-TB7® from Arkema was premixed with solid sulfur and stearic acid and ZnO in powder form, then introduced into the first hopper by the second metering device.

The temperature settings within the co-kneader were as follows: Zone 1: 140° C.; Zone 2: 130° C.; Screw: 120° C.

At the outlet of the die, the masterbatch consisting by weight of 20% of sulfur, 20% of CNT, 20% of VULTAC TB7®, 15% of stearic acid and 25% of ZnO, is in the form of granules obtained by pelletizing, cooled by a water jet.

The granules obtained were dried to a moisture content <100 ppm.

This masterbatch may be used as vulcanization agent for the manufacture of motor vehicle shock absorbers.

The invention claimed is:

1. A process for preparing a masterbatch comprising from 0.01% to 50% by weight of carbon-based nanofillers, comprising:
   (a) introducing at least one sulfur-based material, carbon-based nanofillers, and optionally a rheology modifier into a compounding device;
   (b) melting the sulfur-based material;
   (c) kneading the molten sulfur-based material and the carbon-based nanofillers and optionally the rheology modifier to form a mixture, which is in an agglomerated solid physical form; and
   (d) recovering the mixture in an agglomerated solid physical form;
   (e) optionally grinding the mixture into a powder,
   characterized in that the sulfur-based material is elemental sulfur, alone or in a mixture with at least one other sulfur-based material.

2. The process as claimed in claim 1, characterized in that the compounding device is a co-kneader or a co-rotating twin-screw extruder.

3. The process as claimed in claim 1, characterized in that the carbon-based nanofillers comprise carbon nanotubes, carbon nanofibers, graphene or carbon black or a mixture thereof in any proportions.

4. The process as claimed in claim 1, characterized in that the content of carbon-based nanofillers ranges from 1% to 30% by weight relative to the total weight of the masterbatch.

5. The process as claimed in claim 1, characterized in that the rheology modifier comprises dimethyl sulfide, diethyl sulfide, dipropyl sulfide, dibutyl sulfide, dimethyl disulfide, diethyl disulfide, dipropyl disulfide, dibutyl disulfide, the trisulfide homologs thereof, the tetrasulfide homologs thereof, the pentasulfide homologs thereof, the hexasulfide homologs thereof, alone or in mixtures of two or more thereof in any proportions.

6. The process as claimed in claim 5, characterized in that the amount of rheology modifier is between 0.01% and 5% by weight relative to the total weight of the masterbatch.

7. A solid composition comprising from 1 to 30% by weight of carbon-based nanofillers homogenously dispersed in a mass of particles of sulfur-based material.

8. The solid composition as claimed in claim 7, also comprising at least one additive selected from the group consisting of rheology modifiers, vulcanization accelerators or activators, lubricants, pigments, stabilizers, fillers or reinforcers, antistatic agents, fungicides, flame retardants, solvents, ionic conductors, binders, and the combination thereof.

9. A powder obtained by grinding the composition as claimed in claim 7.

10. The powder as claimed in claim 9, characterized by a median diameter $D_{50}$ of between 1 and 60 µm.

11. The solid composition of claim 7, comprising from 5% to 25% by weight of carbon-based nanofillers homogenously dispersed in a mass of particles of sulfur-based material.

* * * * *